May 26, 1942.    A. B. WILSON ET AL    2,283,962
RIMMING MACHINE
Filed Sept. 1, 1938    7 Sheets-Sheet 1

Fig. 1

Inventor
Allen B. Wilson
Edwin V. Swangren
Strauch & Hoffman
Attorneys

May 26, 1942.  A. B. WILSON ET AL  2,283,962
RIMMING MACHINE
Filed Sept. 1, 1938   7 Sheets-Sheet 3

Inventor
Allen B. Wilson
Edwin V. Swangren

By Strauch & Hoffman
Attorneys

May 26, 1942.  A. B. WILSON ET AL  2,283,962

RIMMING MACHINE

Filed Sept. 1, 1938  7 Sheets-Sheet 6

Inventor

Allen B. Wilson
Edwin V. Swangren

By Strauch & Hoffman
Attorneys

Patented May 26, 1942

2,283,962

UNITED STATES PATENT OFFICE 2,283,962

RIMMING MACHINE

Allen B. Wilson, Evanston, and Edwin V. Swangren, Maywood, Ill., assignors to Kimberly Stuart, Menasha, Wis.

Application September 1, 1938, Serial No. 228,028

10 Claims. (Cl. 153—1)

This invention relates to an apparatus for making containers, and more particularly to apparatus for making containers of the type which are constructed with reinforced edge portions.

The use of containers made of paper, pulp board, fibrous sheet material or the like for the sale of food products or the like has become common practice. Since containers made of these materials are usually easily bendable, ordinarily it has become desirable to reinforce them to resist distortion and prevent consequent injury to the product in the container. One manner of reinforcing these containers which has heretofore been proposed is to fasten a strip of some fairly rigid but bendable material such as metal along the peripheral edge of the container after it has been formed into the desired shape. In the copending application of Garrett B. Linderman, Jr., Serial No. 150,447, filed June 26, 1937 (Patent 2,125,793, granted Aug. 2, 1938) there is disclosed the use of a strip of metal as a stiffening rim along the peripheral edge of a paper pie plate or similar utensil.

The present invention relates generally to improvements and refinements in the apparatus disclosed in the aforementioned application. In commercial production of reinforced paper utensils, it is desirable to speed up production and cut down material costs as much as possible without sacrificing the distortion resisting qualities of the utensil.

Accordingly, it is a major object of the present invention to provide novel apparatus for speedily and positively fastening stiffening or reinforcing members to portions of light weight containers or utensils made of paper or similar materials, and to devise a novel container having a reenforced edge portion.

It is a further object of the invention to provide novel apparatus for applying stiffening rims of metal or other suitable material to the peripheral edges of pie plates or similar containers.

A further object is to provide novel apparatus for securing a reinforcing member about the peripheral edge of a container of paper or the like, and wherein the container and reinforcing member are synchronously fed to progressively present the edge of the container in cooperative relation with the member along its length. Preferably the apparatus is adjustable to permit operation upon containers of different size.

A further object of the invention is to provide novel cooperating rollers and/or dies or similar forming devices for shaping and applying a sheet metal rim to a container of paper, other fibrous material, or the like.

It is a further object of the invention to provide a novel apparatus for making a reenforced container from a sheet of paper or similar material, wherein the material is formed to shape and supplied with a reenforcing rim in automatically progressive operations.

Further objects of the invention will presently appear as the description of the invention proceeds in connection with the appended claims and the annexed drawings in which:

Figure 6 is an end view of the one revolution clutch of the machine;

Figure 1:
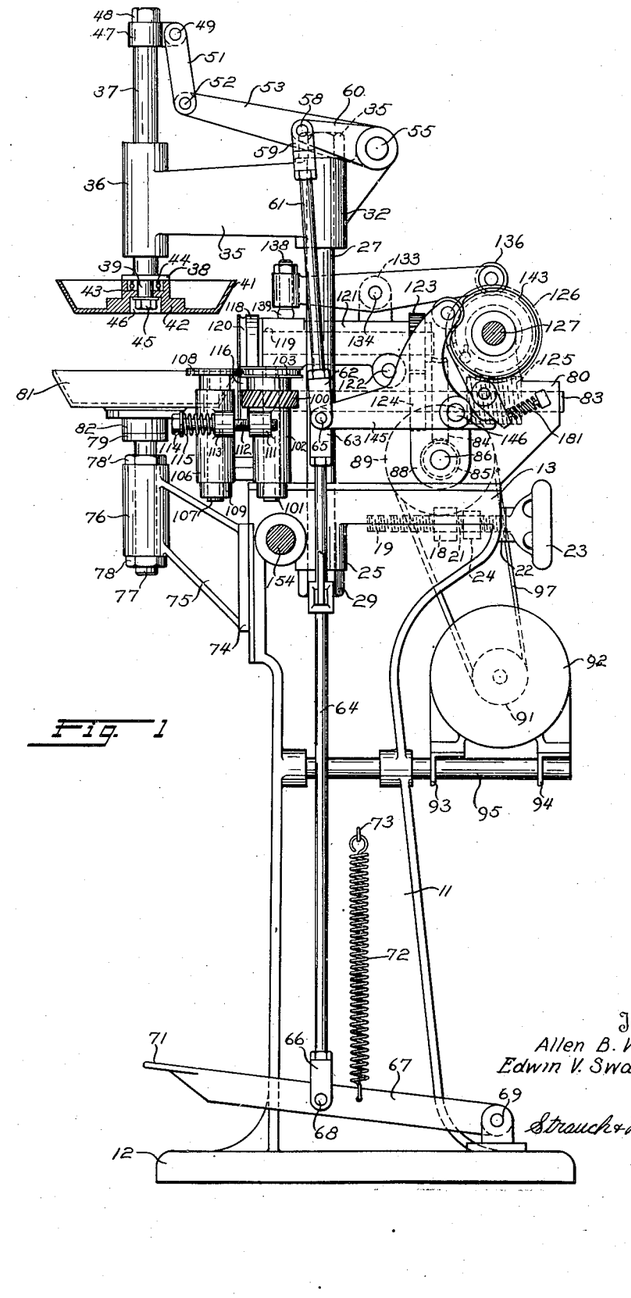
Figure 1 is a side elevation of a complete plate rimming machine constructed according to the principles of my invention.
Figures 2, 2A, 2B, 2C:
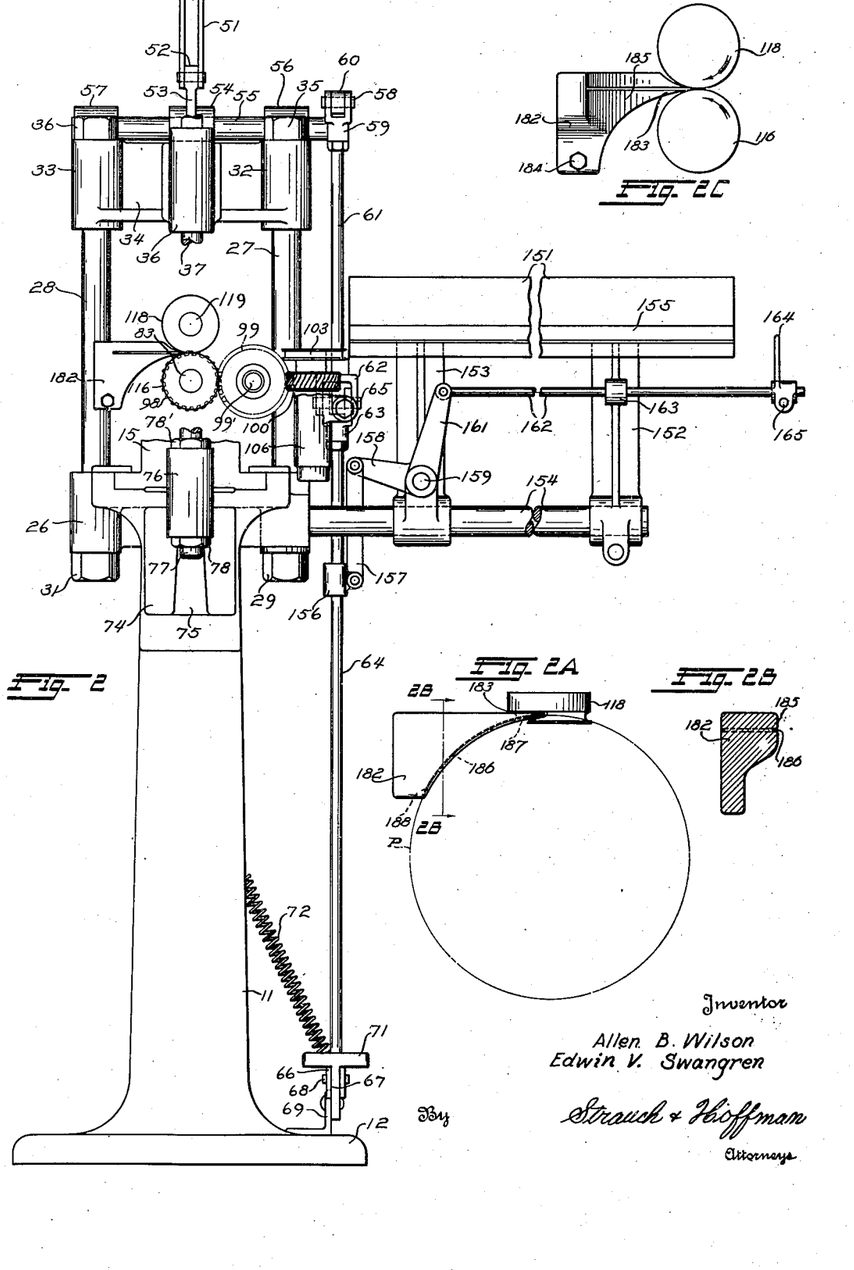
Figure 2 is a front elevation of part of the machine of Figure 1 illustrating especially the strip feeding arrangements.
Figure 2A is a top plan view of the roll and curling shoe assembly.
Figure 2B is a sectional view taken on the line 2B—2B of Figure 2A.
Figure 2C is a fragmental view of the front of the machine and shows the curling shoe and roll assembly.
Figures 3, 7, 8:
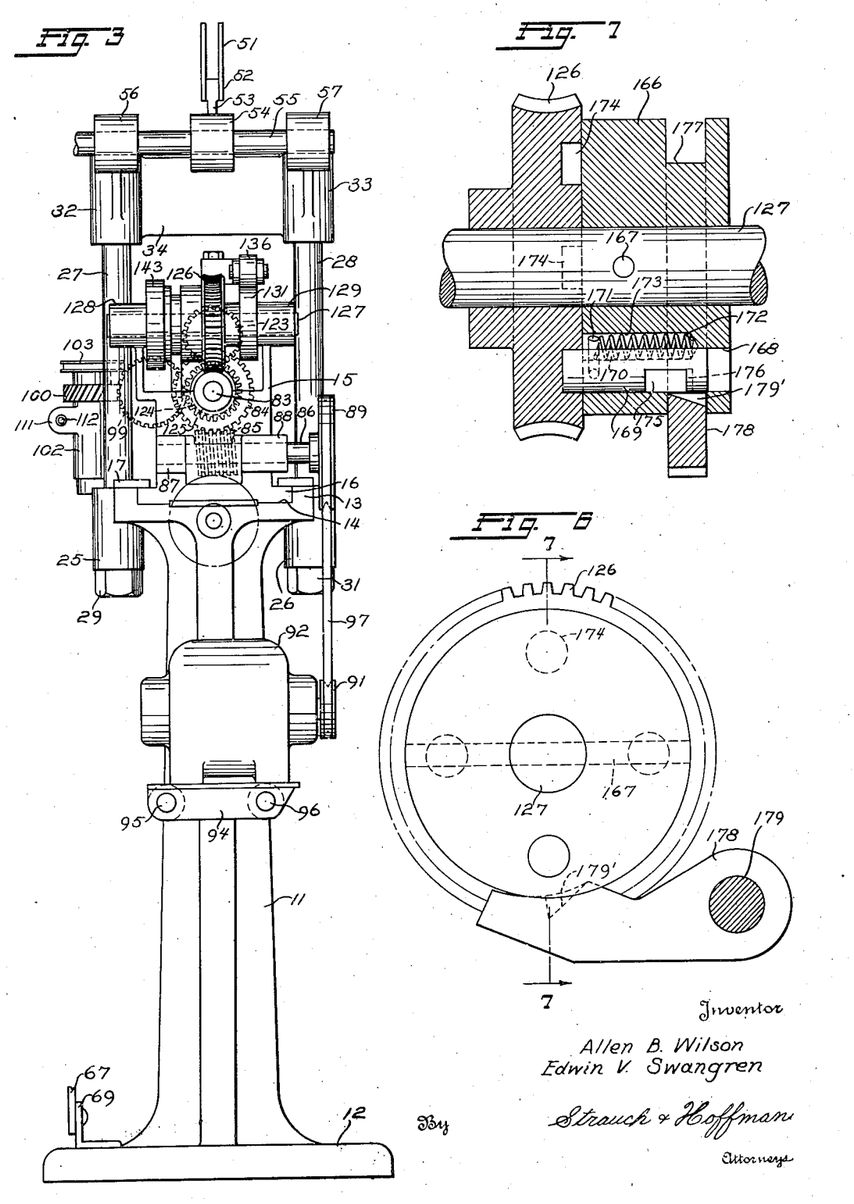
Figure 3 is a rear elevation of part of the machine of Figure 1 illustrating especially the drive and cam arrangements.
Figure 7 is a section taken along line 7—7 of Figure 6 illustrating especially the clutch pin arrangement.
Figure 8 is a transverse sectional view of one form of pre-bent strip before entering the forming rollers.

Referring to Figures 1-3 the plate rimming machine of our invention is mounted upon a base 11 rising from a pedestal 12 which may be bolted or otherwise secured to the floor or a similar support. A relatively wide platform 13 is preferably formed integral with the top portion of base 11 and is formed with guide surfaces 14 for slidably supporting an adjustable head 15. Head 15 is provided wth laterally extending feet 16 which are preferably machined or otherwise formed to cooperate with guide surfaces 14. A pair of laterally extending plates 17 are secured longitudinally along each side of platform 13 and plates 17 extend laterally over the upper edges of feet 16 to form part of the guideway for feet 16 and prevent head 15 from being displaced vertically from the guideway.

Head 15 is formed with a downwardly extending lug 18 which is internally threaded to receive the threaded end portion 19 of an adjusting screw 21. Screw 21 is rotatably supported in an apertured flange 22, preferably formed integral with base 11, and is provided with an enlarged handle 23 whose inner edge abuts against the outer edge of flange 22. A collar 24 is non-rotatably secured to screw 21 and abuts against the inner edge of flange 22. As handle 23 is rotated, collar 24 and the inner edge of handle 23 cooperate with flange 22 to prevent axial movement of screw 21. But, since screw 21 is in threaded engagement with lug 18, rotation of handle 23 will cause head 15 to slide along guide surfaces 14. The purpose of this adjustment is to adapt the machine for use in rimming plates of different diameter as will later be explained. Platform 13 and base 11 are suitably cut away to accommodate lug 18 and the adjusting mechanism above described.

Plate holding chucks

Upon opposite sides of platform 13 are provided, preferably integral with platform 13, laterally extending bosses 25 and 26 which are formed with vertically extending threaded apertures for receiving the lower ends of parallel rods 27 and 28 respectively. Nuts 29 and 31 are provided upon the lower ends of rods 27 and 28 where they project downwardly from their respective bosses. The upper ends of rods 27 and 28 are similarly threaded and pass through suitable threaded bores formed in vertically disposed bosses 32 and 33 formed at opposite ends of a relatively heavy rigid chuck support 34. Nuts 35 and 36 are provided upon the ends of rods 27 and 28 where they extend upwardly from their respective bosses.

Rods 27 and 28 are preferably very rigid and, when nuts 29, 31, 35 and 36 are tightened, are non-rotatably connected to both head 13 and support 34 so that support 34 is rigidly mounted upon head 13. An arm 35, preferably integral with support 34, extends forwardly from support 34 substantially midway between bosseh 32 and 33 and terminates in a boss 36 having a smooth vertical bore.

A vertical shaft 37 is slidably mounted in the bore of boss 36 and is formed at its lower end with a wide lateral flange 38 from which extends axially a bearing portion 39 of reduced cross section terminating in a threaded end portion. An upper chuck member 41 is rotatably supported upon the lower end of shaft 37. Chuck 41 is formed with a hub 42 which is provided with an annular cup-shaped recess 43 at its upper end for receiving a suitable ball bearing assembly 44. Bearing 44 surrounds bearing portion 39 which extends through a suitable aperture in the bottom of cup 43. A suitable nut and washer assembly 45 fitting upon the lower threaded end of shaft 37 is positioned within a suitable recess 46 formed at the lower end of hub 42.

Flange 38 and nut and washer assembly 45 cooperate to prevent displacement of chuck 41 axially of shaft 37. Preferably the lower surface of flange 38 and the upper edges of cup 43 are machined to allow relative rotation therebetween. Bearing 44 serves as both a journal and thrust bearing for chuck 41. Chuck 41 is generally frusto-conical in shape and its lower pie plate engaging surface is preferably smooth although corrugations or other suitable formations may be provided as will later be described.

The upper end of shaft 37 is provided with a shouldered portion of reduced cross-section upon which is non-rotatably secured one end of a link 47. Nut 48 prevents axial movement of link 47 and helps to secure the link rigidly to shaft 37. At its other end link 47 has pivotally secured thereto at 49 a bifurcated link 51 whose other end is connected by a suitable pivot assembly 52 to the forwardly extending end of an arm 53. The other end of arm 53 is provided with a hollow boss 54 fitting non-rotatably and non-slidably upon a cross shaft 55.

Shaft 55 is journaled at its opposite ends in suitable bores formed in upstanding lugs 56 and 57 which are preferably integral with bosses 32 and 33 respectively. Shaft 55 extends beyond 56 and has non-rotatably secured thereto one end of a relatively short arm 60 whose other end is connected by means of a suitable pivot assembly 58 to an adjustable clevis 59 at the upper end of a vertical extending rod 61.

The lower end of rod 61 is provided with a bifurcated member 62 which is connected to an interfitting bifurcated member 63 at the upper end of a treadle operated rod 64 by a suitable pivot assembly 65. The lower end of rod 64 is provided with a bifurcated member 66 which embraces opposite sides of a treadle lever 67 intermediate its ends and is pivotally secured thereto by a suitable pivot assembly 68. Lever 67 is pivoted at one end upon an upstanding lug formation 69 on pedestal 12. At its other end, a foot receiving portion 71 is provided on lever 67. A coil spring 72 of suitable strength extends between lever 67 and a rigid anchor formation 73 on base 11 and tends to urge lever 67 in a clockwise direction (Figure 1) about its pivot at 69 for a purpose to be described later.

Below the front edge of platform 13, a plate 74 is rigidly secured to the front surface of base 11. Plate 74 is formed with an integral forwardly and upwardly extending arm 75 which terminates in a boss 76 having a vertical bore for receiving the threaded shaft 77. The axis of shaft 77 is preferably aligned with the axis of shaft 37 and locking nuts 78 and 78' retain shaft 77 is a desired position of vertical adjustment upon boss 76. The upper end of shaft 77 is provided with an enlarged flange 79 for supporting a suitable bearing assembly disposed in a hub 82 at the bottom of lower chuck member 81. Hub 82 is preferably of substantially the same construction as hub 42 of the upper chuck so that chuck 81 is freely and rotatably supported upon shaft 77.

Chuck 81 is substantially dish-shaped and is designed to cooperate with upper chuck 41 for retaining a pie plate in operative position in the machine while a rim is being applied to the plate. It will be seen that when treadle lever 67 is depressed as by stepping on foot portion 71 such motion is effective through rods 64 and 61, arm 60, cross shaft 55, arm 53, link 51, link 47 and shaft 37 to press upper chuck 41 into the conical recess in lower chuck 81 so that a pie plate placed in chuck 81 will be firmly gripped between the chuck members which are free to rotate together about the axes of their supporting shafts.

*Strip bending mechanism*

A longitudinally extending shaft 83 is rotatably supported upon head 15. The rear end of shaft 83 is journaled in an upstanding lug 80 at the rear end of head 15 while the front portion of shaft 83 is journaled in a suitable support (not shown) on head 15 near the chuck members. Shaft 83 is provided with a worm gear 84 which meshes with a worm 85 secured to a transverse shaft 86 as shown in Figure 3. Shaft 86 is journaled upon a pair of spaced apertured lugs 87 and 88, preferably integral with head 15, and extends laterally beyond lug 88 to receive a grooved pulley 89 which is non-rotatably secured thereto by a suitable fastening means.

Pulley 89 is vertically aligned with a second grooved pulley 91 secured to the shaft of an electric motor 92 whose base is secured to a pair of parallel angle supports 93 and 94. The depending legs of angles 93 and 94 are apertured to fit over a pair of rearwardly extending support bars 95 and 96 whose forward ends are rigidly secured to base 11. A suitable belt 97 extends between pulleys 91 and 89. The purpose of adjustably mounting motor 92 for sliding movement along bars 95 and 96 is to maintain belt 97 in proper tension no matter what adjustment of head 15 is effected by rotating handle 23.

Figure 5:
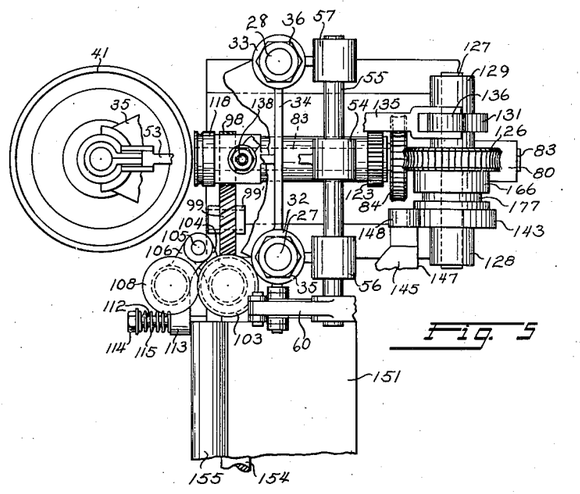
Figure 5 is a top plan view of part of the machine of Figure 4 illustrating especially the strip pre-bending rollers.
Figure 8:
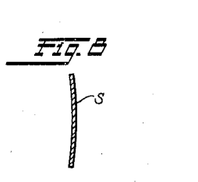

Adjacent its forward end, shaft 83 is provided with a gear 98, non-rotatably secured thereto, and held against axial displacement thereupon as shown in Figure 5. Gear 98 is meshed with an idler gear 99 supported for free rotation upon a suitable support 99' fixed to head 15. Idler gear 99 meshes with a gear 100 secured upon a vertically extending shaft 101 which is journaled for free rotation in a suitable bracket 102 rigidly secured to head 15. A collar 110, non-rotatably secured to the lower end of shaft 101, and the hub of gear 100 cooperate to prevent axial displacement of shaft 101 in bracket 102. A grooved forming roller 103 is non-rotatably fastened upon the upper end of shaft 101. The peripheral shape of this roller and its function will be described later in connection with Figure 8.

Bracket 102 is provided with a laterally extending ear 104 upon which is swingably mounted, by a suitable pivot assembly at 105, an arm 106 whose free end is formed to support for free rotation a vertically extending shaft 107. At its upper end shaft 107 has non-rotatably secured thereto a suitable forming roller 108 designed to cooperate with roller 103 as will later be described in connection with Figure 8. The hub of roller 108 and an enlarged collar 109 fixed to the lower end of shaft 107 cooperate with arm 106 to prevent axial displacement of shaft 107.

Bracket 102 is formed with a laterally extending integral lug 111 from which projects a stud 112 to pass loosely through an aligned aperture in a similar lug 113 formed integral with arm 106. The threaded outer end of stud 112 is provided with a nut and washer assembly 114 for retaining a coil spring 115 which surrounds stud 112 and extends between assembly 114 and lug 113. As seen in Figure 5, spring 115 urges arm 106 to rotate in a counter-clockwise direction about its pivot so as to urge roller 108 into the grooved periphery of roller 103 for a purpose later to be described.

Figure 10:
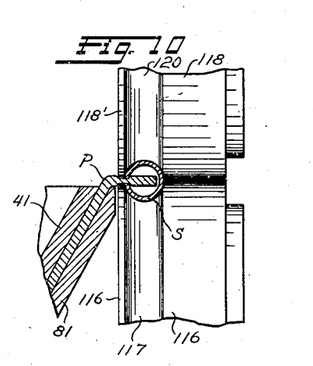
Figure 10 is a diagrammatic view on a large scale illustrating the action of the curling or crimping rollers in clamping the strip upon the paper plate.

A lower strip curling roller 116, provided with a strip contacting face 117 of desired shape, is non-rotatably secured upon the forward end of shaft 83. An upper strip curling roller 118 provided with a strip contacting face 120 is mounted directly above roller 116 and is non-rotatably secured upon the forward end of a shaft 119 whose axis extends generally parallel to shaft 83. rollers 116 and 118 are substantially in contact As shown in Figure 10, the peripheral faces of rollers 116 and 118 are substantially in contact when shafts 83 and 119 are parallel. Shaft 119 is rotatably journaled upon a supporting arm 121 which is pivotally secured, by a suitable pivot assembly at 122, to head 15. At its rear end shaft 119 carries a gear 123 which meshes with a gear 124 fixed to shaft 83 below.

Figure 13:
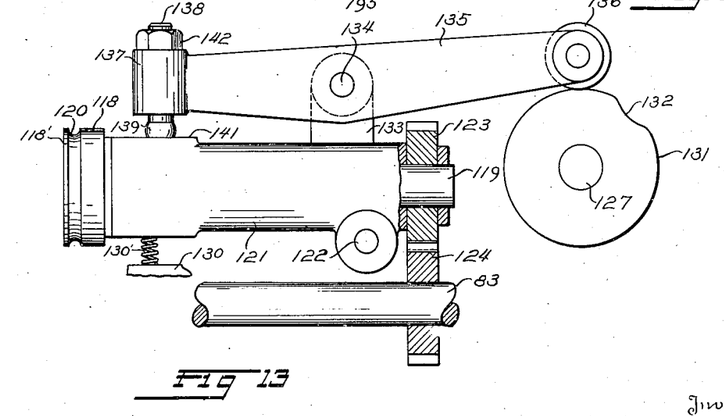
Figure 13 is an enlarged side view of the rocker arm arrangement for permitting separation of the curling or crimping rollers.
Figure 14:
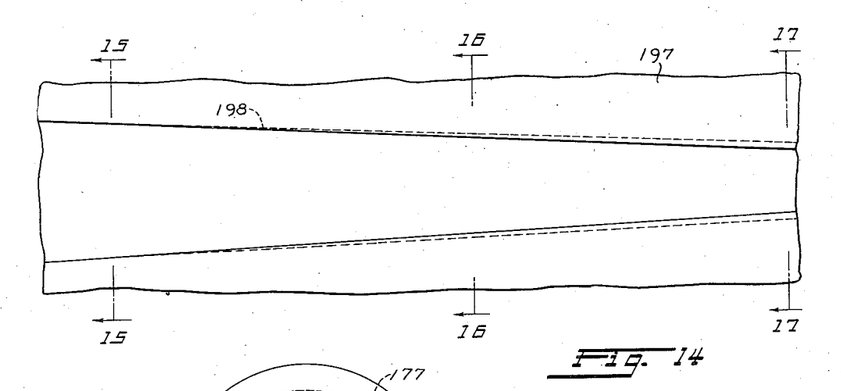
Figure 14 is a side elevation of a rigid die which may be substituted for the die rollers of Figure 9.
Figure 15:
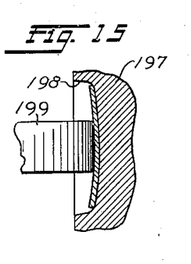
Figure 15 is a transverse section along line 15—15 of Figure 14.
Figure 16:
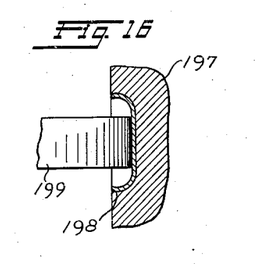
Figure 16 is a transverse section along line 16—16 of Figure 14.
Figure 17:
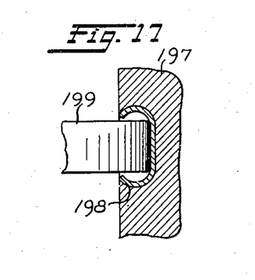
Figure 17 is a transverse section along line 17—17 of Figure 14.

With reference to Figure 13, gears 123 and 124 are constantly engaged but the gear centers are located a few thousandths of an inch further apart than the pitch diameter of the gears. This arrangement has been designed to allow pivotal movement of arm 121 about pivot 122 while the gears are rotating without binding. Pivot 122 is located as close as possible to gear 123 and preferably upon the extended pitch line of that gear to minimize any tendency for the meshed gears to bind during operation. Directly below arm 121, head 15 is formed with a rigid stop lug 130, and a suitable spring 130' extends between lug 130 and arm 121 tending to rotate arm 121 about its pivot 122 in a clockwise direction and thereby separate the curling rollers.

From the above it will be seen that roller 118 is mounted for movement toward and away from roller 116 to permit insertion of a plate edge to be rimmed between the rollers. However, in order to insure proper action between gears 123 and 124 during rimming operations, a cam arrangement is provided for insuring that shaft 119 is maintained parallel to shaft 83 during that period.

Shaft 83 is provided, adjacent lug 80, with a worm 125 which meshes with a worm gear 126 mounted upon an intermediate portion of a transverse cam shaft 127. Shaft 127 is suitably journaled at opposite ends in a pair of bosses 128 and 129 projecting upwardly from opposite sides of head 15. A cam 131 having a recessed portion 132 at its periphery is non-rotatably secured to shaft 127.

Head 15 is formed with an upstanding lug 133 provided with a suitable pivot assembly 134 for supporting a rocker arm 135 intermediate its ends. At one end arm 135 is provided with a freely rotatable roller 136 designed to follow the surface of cam 131. At its other end arm 135 is bent laterally to a position above arm 121 and is there formed with a threaded boss 137 through which extends a stud 138 having a suitable stop formation 139 for engaging a stop formation 141 rigid with support 121. Stud 138 is maintained in desired positions of vertical adjustment in boss 137 by a nut 142. This adjustment varies the distance between stop 139 and member 141 and hence controls the pressure of roller 118 upon the rim strip as will later be explained.

A second cam 143 (see Figure 5) is non-rotatably secured to shaft 127 and is provided with a peripheral recess 144. A suitable arm 145 is pivotally mounted upon head 15 at 146 and is pivotally secured to the pivot assembly 65 within the arms of bifurcated member 63. Arm 145 is formed with a laterally extending integral portion 147 which carries a freely rotatable roller 148 designed to follow the surface of cam 143.

Arm 145 is further provided with an abutment 145' adapted to engage a lever 150 fixed upon one end of a latch control rock shaft 179 which is journaled, by some suitable means (not shown), on head 15. Lever 150 is constantly urged in a clockwise direction (Figure 4) by a spring 181 which extends between the free end of lever 150 and a stop formation 160 rigid with head 15 for a purpose later to be described.

Figure 11:
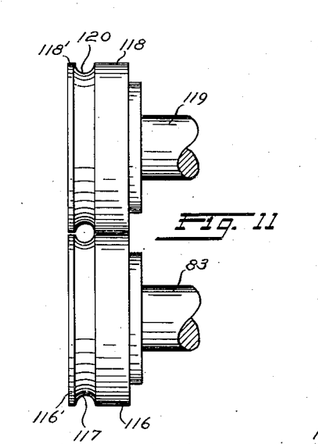
Figure 11 is a side elevation illustrating a preferred form of curling or crimping rollers.

With reference to Figure 11, the preferred form of curling rollers 116 and 118 is there illustrated. The metal rim contacting faces of the curling rollers comprise substantially semi-cylindrical grooves 117 and 120, respectively, on the roller peripheries and these grooves cooperate to form a substantially circular pass in which the strip is progressively curled about the plate edge as will later be described. Rollers 116 and 118 are provided with relatively narrow end flanges 116' and 118', respectively, between which the plate to be rimmed is gripped as indicated in Figure 10 and as will later be described. The plate gripping peripheries of flanges 116' and 118' are spaced to accommodate the material of the plate being rimmed.

*Strip guide mechanism*

Figure 4:
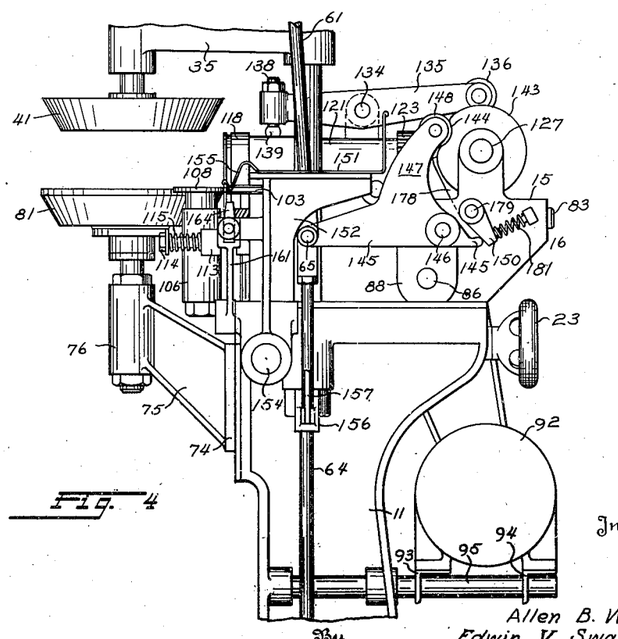
Figure 4 is a side elevation of part of the machine of Figure 1 partly in section and illustrating especially the cam operated chuck control linkage and the latch control mechanism.

With reference to Figures 2, 4 and 5 the strips of metal or other rigid material to be secured to the rim of the plate in chuck 81 are preferably cut to proper length and placed in a suitable bin 151 which is rigidly supported by spaced legs 152 and 153 upon a rigid bar 154 extending laterally from the base 11 of the machine. Preferably, this material is slightly preformed, as shown in Figure 8, before insertion in the apparatus of the invention. One wall of bin 151 (see Figure 4) is bent generally downwardly for the major portion of its depth to form a substantially V-shaped trough 155 to which the strips of metal are manually transferred from bin 151 as desired. Trough 155 extends substantially tangentially to rollers 103 and 108 at their contacting edges.

A collar 156 is rigidly secured to treadle rod 64. A link 157 is pivotally connected at one end to collar 156 and is pivotally connected at its other end to one end of an arm 158 rigid with a cross shaft 159 suitably journaled in arm 153. An upwardly extending arm 161, rigid with shaft 159, has its free end pivotally connected to the inner end of a slidable bar 162 which is supported for movement substantially parallel to trough 155 in a hollow boss 163 integral with arm 152. At its outer end, bar 162 carries a strip pushing member 164 which can be locked in any desired position of adjustment along bar 162 by a suitable clamping means at 165.

When treadle lever 67 is depressed, motion is transmitted through link 157, arm 158, shaft 159, arm 161 and bar 162 to force member 164 into engagement with the projecting end of a metal strip in trough 155. In this manner the metal strip is pushed into the apparatus and positive and timed feeding of strips into the machine is assured.

*One revolution clutch*

With reference to Figures 4–7, inclusive, worm gear 126 is mounted upon shaft 127 in such a manner that it is freely rotatable thereupon but is maintained against axial displacement therealong. A clutch member 166 is non-rotatably secured upon shaft 127 by means of a pin 167 which extends diametrically through the shaft and clutch member. Clutch member 166 is provided with a bore 168 extending generally parallel to shaft 127 and slidably receiving a clutch pin 169. Pin 169 is provided with a radially extending stop 171 which extends through a slot 170 and abuts against the outer end of a coil spring 172 disposed in a recess 173 in clutch member 166. Spring 172 urges pin 169 toward gear 126 which is provided with a plurality of internal sockets 174 for receiving the inner end of pin 169 to lock the gear and clutch element to rotate together at predetermined period.

At one side pin 169 is provided with a groove 175 having an inclined surface at 176. The disposition of stop 171 in slot 170 keeps pin 169 from rotating in bore 168. Clutch member 166 is formed with a peripheral groove 177 which passes through bore 168.

A latch 178 is non-rotatably secured to rock shaft 179 and its free end is urged into groove 177 by the pressure of spring 181 against lever 150 (see Figure 4). Latch 178 is of such width that it rides in groove 177 at all times and at predetermined intervals may be forced into the pin groove 175 to remove pin 169 from socket 174. To this end latch 178 is formed with an inclined portion 179' for cooperating with inclined surface 176 on pin 169.

In Figure 7 the parts are illustrated in the position they assume just after clutch latch 178 has been moved against the tension of spring 181 to remove the latch from groove 175. Removal of latch 178 permits spring 173 to force pin 169 inwardly into the first available socket 174 of constantly moving gear 126 so that gear 126 and shaft 127 are locked together for simultaneous rotation. After being removed from groove 175 for a period of time sufficient to allow insertion of pin 169 in socket 174 as above described, latch 178 is released and is forced by spring 181 against the inner surface of groove 177. After a single revolution of clutch member 166, the inclined surfaces at 176 and 179' cooperate under the urge of spring 181 to force pin 169 to the right in Figure 7 and thus break the driving connection between gear 126 and shaft 127 for a purpose to be described later.

Operation

In operation, shaft 86 is continuously driven by means of its belt and pulley arrangement with motor 92, and worm 85 and worm gear 84 cooperate to continuously rotate shaft 83 and the forming and curling rollers geared thereto. A preformed paper plate P is placed in chuck 81 with its flanged rim extending beyond the peripheral edge of the chuck into the space between rollers 116 and 118. At this time follower 136 is disposed in cam recess 132 thus permitting spring 130' to force the curling rollers apart, and follower 148 is disposed in cam recess 144. A strip of metal S, preferably slightly prebent laterally as shown in Figure 8, is manually transferred from bin 151 to trough 155, care being taken to place the concave side of the strip toward the rim of plate P.

The operator then depresses treadle lever 67 to cause upper chuck 41 to descend and securely clamp plate P in lower chuck 81. Depression of the treadle lever also trips latch 178 through the medium of arm 145, abutment 145', lever 150 and rock shaft 179 to permit gear 126 to drive shaft 127 for a complete revolution. Actuation of arm 145 by the treadle also removes roller 148 from cam recess 144. Proper entry of strip S between forming rollers 103, 108 is insured by the action of member 164 which is actuated by the slidable movement of bar 162 to engage the projecting end of a strip in trough 155 and push it into the space between the forming rollers.

Figure 9:
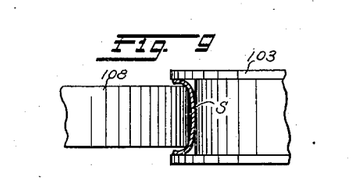
Figure 9 is a diagrammatic view on a large scale illustrating the action of the forming rollers or dies upon the rim strip of Figure 8.

Rollers 103 and 108 are formed as shown in Figure 9 to further bend the strip S to a proper predetermined form before it is advanced to the curling rollers 116, 118. Strip S is bent into the form shown in Figure 9 and at the same time is fed toward the curling rollers due to friction between the strip and forming rollers and since roller 108 is constantly urged into engagement with the strip by spring 115.

After leaving the forming rollers, strip S is advanced between rollers 116 and 118 so that its opposite edges are engaged by the opposed strip contacting and beading faces 120 and 117. As explained above faces 120 and 117 are so shaped that, upon rotation of rollers 116 and 118, strip S is curled or beaded about the rim of plate P as shown in Figure 10. As shown in Figure 10, the above described curling action forces the opposite lateral relatively sharp cornered edges of the metal strip deeply into the relatively soft material of plate P so that strip S is securely locked in biting engagement with plate P.

The above described strip curling and crimping action not only fastens the strip to the plate but, by reason of the tight frictional engagement of rollers 116 and 118 with strip S and the gripping action of flanges 116' and 118', causes rotation of the entire chuck unit about its ball bearing supports so that strip S is progressively secured along the entire peripheral edge of plate P.

Figure 10A:
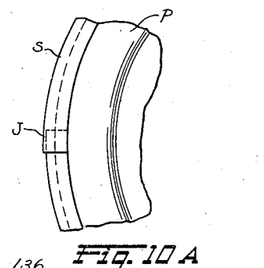
Figure 10A is a plan view of a plate with the reenforcing strip attached, illustrating the overlapped interlocking joint.

The length of strip S may be predetermined as equal to the circumference of the edge to be rimmed. However, it is preferable to make strip S of a length slightly greater than the plate rim circumference so that the opposite ends of the crimped strip will cooperate to form a tight overlapping lock joint J of the type illustrated in Figure 10A.

The tubular bead formed by strip S when secured to the plate as above described is very sturdy and is clamped to the plate most firmly at joint J where the overlapped bead portions are telescoped and tightly squeezed together so that the effect is substantially that of a continuous bead around the plate edge.

Curling shoe assembly

After the strip has been locked onto the flange of the receptacle by the rolls 116 and 118, it is acted upon by a curling shoe assembly which performs two definite operations upon the strip. First, it effects a final clinching of the strip on the plate and secondly, it smoothly curls the strip so as to make it conform accurately to the shape of the plate.

The curling shoe is designated as 182, and it is seen more clearly in Figures 2, 2A, 2B, 2C and 5. Shoe 182 is provided with a tapered portion 183 which extends into the space between rollers 116 and 118 at the point where the strip leaves them, and it is secured to any suitable stationary part of the machine (not shown) by cap screws 184.

Shoe 182 is provided with a curved face 185, which conforms to the curvature of the periphery of mandrel 81, and groove 186 is provided therein. The latter is provided with comparatively shallow leading and trailing ends 187 and 188, respectively. Groove 186 is of a width somewhat less than that of the strip material after it has been applied to the rim and emerges from rollers 116 and 118, with the result that as the rim-carrying plate flange is forced through the groove, the rim will be firmly and finally clenched into biting engagement with the flange of the plate. Also, by reason of the curvature of the groove, the strip will be smoothly brought to the form of the periphery of the flange while the operation is proceeding.

Although I have shown and prefer to employ a curling shoe assembly to act upon the plate after the rolls 116 and 118 lock the strip to the flange of the plate, because it effects a final permanent clinching of the parts, it is to be understood that the invention is not limited thereto and that if desired, in some instances, it may be omitted and the appended claims are intended to cover the invention both with and without the curling shoe assembly.

Modifications

Figure 12:
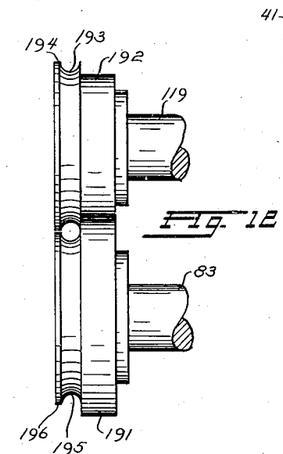
Figure 12 is a side elevation illustrating a modified arrangement of curling or crimping rollers which may be used instead of the rollers of Figure 11.

In Figure 12 is illustrated a curling roller arrangement which may be used in place of that at Figure 11. Here rollers 191 and 192 are of different diameter and the smaller roller 192 is formed with an enlarged portion which is grooved at 193 and provided with a narrow end flange 194. The larger roller 191 is formed with a reduced portion which is grooved at 195 and provided with a narrow end flange 196 and is adapted to cooperate with roller 192 to curl a strip of metal about the edge of a paper plate in the same manner as the rollers of Figure 11. Flanges 194 and 195 are spaced slightly to allow for the thickness of the plate material gripped thereby.

The arrangement of Figure 12 is especially advantageous where the paper plates have flanges of small width since the outer lateral face of the larger roller limits the degree of insertion of the plate flange between the rollers.

The stationary forming die 197 illustrated in Figures 14-17 may be used in place of the forming rollers of Figure 9 with the strip material being advanced therethrough by any suitable means such as a friction couple. Die 197 is provided with a tapered forming groove 198 and a cooperating removable shoe 199, and as the strip is advanced from left to right in Figure 14 it is preformed to a shape suitable for feeding into the pass between the curling rollers.

Figure 18:
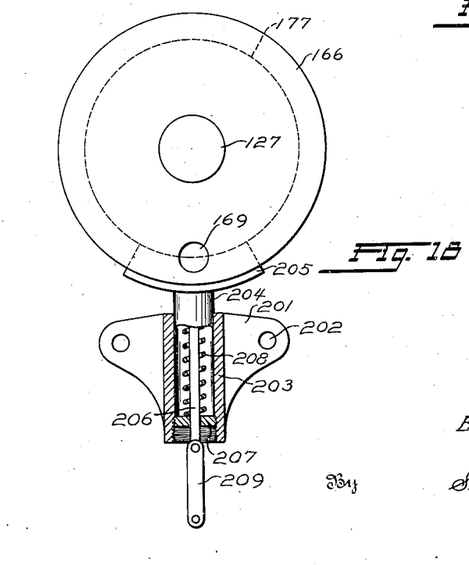
Figure 18 illustrates a modified latch which may be used with the one way clutch of Figures 6 and 7.

The one revolution clutch unit illustrated in Figure 18 embodies a modified latch arrangement wherein the above described clutch unit 166 having a peripheral groove 177 is employed. A bracket 201, secured to head 15 by rivets, bolts or the like through holes 202 is provided with a vertical hollow boss 203 in which is slidably disposed a latch element 204. The upper end shoe 205 of element 204 is arcuate in shape and suitably formed for cooperating with clutch pin 169 in the same manner as latch 178 above described. The lower extension 206 of element 204 is of reduced cross-section and passes through an apertured stop plate 207 secured in the threaded lower end of boss 203. A compressed coil spring 208 surrounds extension 206 and extends between plate 207 and the enlarged portion of latch element 204.

A link 209, secured pivotally to the lower end of extension 206 is adapted to connect the latch element with an operating member such as the arm 145 or some other arm connected to the foot treadle. In operation, a downward pull on link 209 will separate shoe 205 from pin 169 and cause engagement of the clutch in the manner described above. Release of the force pulling downwardly upon link 209 will permit spring 208 to urge shoe 205 into cooperative engagement with pin 169 at the completion of a revolution of the clutch shaft.

*Plate forming and rimming machine*

Figure 19:
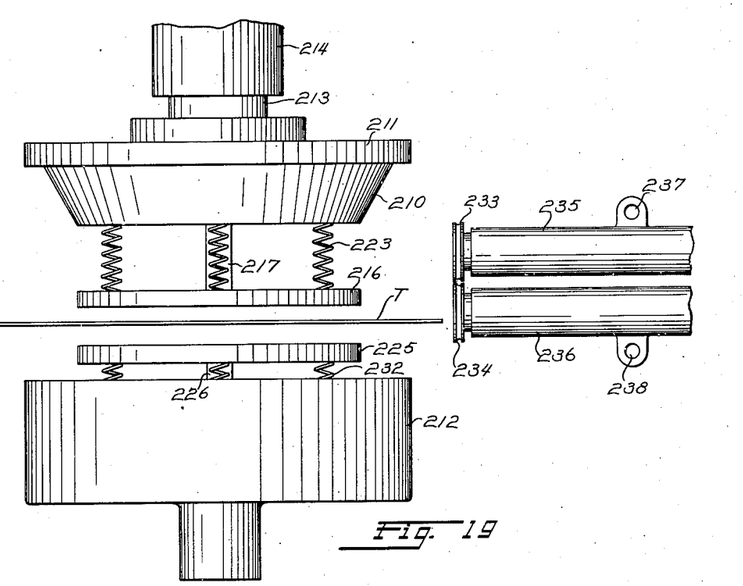
Figure 19 is a side elevational view, partly diagrammatic, of chuck and roller arrangements in a modification of the invention in which the utensil or paper plate is formed to shape and then rimmed without being removed from the chuck. This view shows the sheet material inserted between the plates in readiness for the plate forming operation with the rim bending rollers withdrawn.
Figure 20:
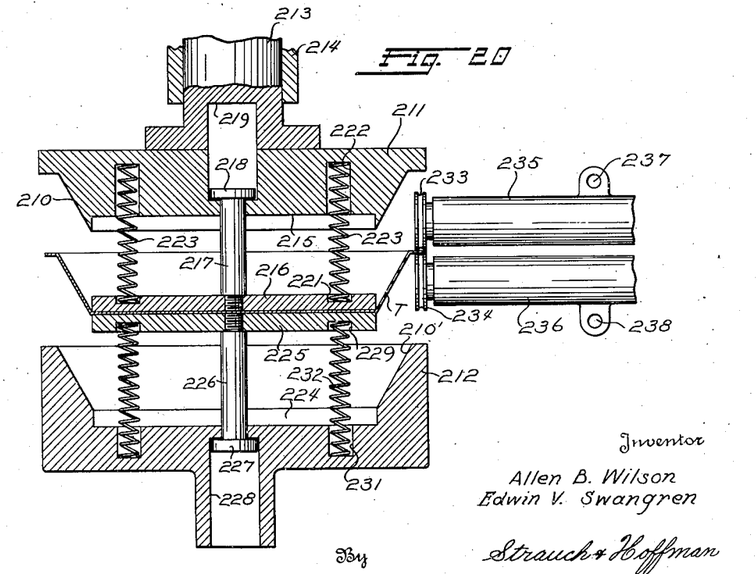
Figure 20 is a side view partly in section of the parts of Figure 19 after the plate has been formed and the rim bending rollers advanced to operative position with respect to the formed plate.

The mechanism of Figures 19 and 20 embodies a form of the invention in which the paper plates are formed from sheets or other flat stock and are then provided with reenforcing rims without removing them from the forming apparatus. The cooperating conical faces 210 and 210' of dies or chucks 211 and 212 respectively are preferably corrugated or otherwise suitably formed to take up excess material from the sheet T from which the plate is to be formed.

The upper chuck 211 is provided with a shaft 213 by means of which it is slidably supported in a guide 214. A suitable treadle mechanism, similar to that above described, may be used for lowering chuck 211 into chuck 212 during the plate forming operation. Chuck 211 is provided with a bottom recess 215 for receiving a kicker plate 216 secured to the threaded end of a plunger element 217 which extends through an aperture in chuck 211 to terminate in an enlarged head portion 218 disposed in a recess 219 within chuck 211.

Plate 216 and chuck 211 are provided with a plurality of cooperating surface recesses 221 and 222 respectively between which extend springs 223 tending to urge plate 216 out of recess 215 and away from the chuck to the fully extended position of Figure 19. Head 218 limits such movement of plate 216.

Similarly, bottom chuck 212 is formed with an internal recess 224 for receiving a kicker plate 225 secured to the threaded end of a plunger 226 which passes through an aperture in chuck 212 and terminates in an enlarged head portion 227 disposed in recess 228 in chuck 212. Plate 225 and chuck 212 are provided with a plurality of surface recesses 229 and 231 respectively between which extend springs 232 tending to urge plate 225 out of recess 224 and away from the chuck 212. Head 227 limits such spring urged movement of the plate 225.

Each of chucks 211 and 212 is suitably mounted for free rotation upon its support much in the manner shown for chucks 41 and 81 above described. However, in this embodiment of the invention a suitable automatically releasable clutch means (not shown, but which may be of any desired construction) is provided for holding chucks 211 and 212 non-rotatable during the plate forming operation as will later be described.

A pair of cooperating strip curling rollers 233 and 234 are mounted upon a movable portion of the machine so that they may be advanced between the chucks to embrace the rim of the plate after the forming operation. Rollers 233 and 234 are fixed to substantially parallel shafts journaled in suitable rockable supports 235 and 236 on a slidable head similar to head 15 above described. Supports 235 and 236 may be rocked about pivots 237 and 238 to separate rollers 233 and 234 and the other strip forming and control mechanism is substantially the same as above described.

In operation, a sheet of material T, cut to proper size, is inserted between the separated chuck elements as shown in Figure 19. At this time the curling rollers and their supports are positioned laterally of the chucks so as not to interfere with the forming operation. The treadle is actuated thereby causing chuck members 211 and 212 to clamp the sheet therebetween and form the sheet into a plate or container of desired shape. During this forming operation chucks 211 and 212 are held non-rotatable with respect to the material T and plates 216 and 225 are forced to seat flush into recesses 215 and 224 respectively and engage opposite sides of the formed plate to provide smooth die surfaces on the chucks.

After the plate has been formed, the automatic clutch mechanism is tripped to render both chucks rotatable freely about their axes and move chuck 211 upwardly a predetermined distance in guide 214. When the upward movement of chuck 211 is checked the formed plate will be held between the kicker plates.

At the same time, the movable support for the curling rollers is advanced automatically to embrace the flanged periphery of the formed plate as shown in Figure 20, and a reenforcing metal strip is secured to the edge of the freely and rotatably supported formed plate. This rimming operation is substantially the same as described above in connection with Figures 1–13.

After the rim is applied the automatic chuck clutch is further actuated to separate the chucks until the reenforced formed plate rests entirely upon kicker plate 225. At the same time the curling rollers are automatically separated to release the formed plate and are moved from between the chucks so that the rimmed formed plate may be easily removed manually and the operations repeated.

During the above described rimming operation, shaft 119 is maintained substantially parallel to shaft 83 and roller 118 is caused to exert a substantial pressure upon the lateral edge of strip S by the action of rocker arm 135 whose follower 136 mounts to the high portion of cam 131 as soon as shaft 127 begins to rotate and during the period the strip is being fastened to the plate.

At the end of a complete revolution of shaft 127, roller 148 drops back into the cam recess 144 from which it was removed by depression of the foot treadle and spring 181 causes latch 178 to withdraw the clutch pin 169 thereby disengaging shaft 127 from its drive until the treadle is again depressed. Movement of roller 148 into the cam recess 144 also locks shaft 127 against overrunning and simultaneously permits spring 172 to positively actuate the chuck control rod 61 to separate the chuck members. At the same time, follower roller 136 falls into recess 132 on cam 131 thereby relieving the pressure of rocker arm 135 on arm 121 and permitting spring 130' to cause separation of the curling rollers. The completely rimmed plate can then be removed manually, a new plate substituted in chuck 81 and the above operations repeated.

The above described machine may be adapted for use in applying rims to different sizes of pie plates. The adjustments illustrated above permit the machine to be operative upon plates having diameter varying from four to nine inches. For plates of different size, suitably sized chuck members are mounted at 41 and 81, cams of proper size are mounted on shaft 127 and the mechanism of head 15 is advanced or retarded to proper position by rotating handle 23. Motor 92 is then shifted to tighten belt 97.

The cams on shaft 127, the chuck members 41 and 81 and the curling rollers are all mounted in such a manner as to be replaced by similar parts of different size, or design as the nature of the work to be performed demands. In each case the arrangement is set up to completely rim a plate in chuck 81 each time shaft 127 makes a complete revolution.

Furthermore, strip S need not be prebent or precut before entering the machine since it is well within the spirit of the invention to provide the machine with means for feeding flat strip material from a coil, cutting it to proper size and bending it as desired all in automatic sequence. It is further within the spirit of the invention to insert properly preformed metal strips directly into the pass between the curling rollers, thereby eliminating the forming step of Figure 9.

Advantages

The machine of my invention is capable of speedy accurate work with very little labor necessary on the part of the operator who handles the plates with his left hand, the strips at bin 151 with his right hand and the treadle with one of his feet. With practice an operator can turn out more than ten finished plates per minute from the illustrated apparatus.

A distinct advantage arising from my invention is a considerable saving in metal over the prior art which used relatively wide metal strips to get the proper rigidity and sufficient space for fastening the metal to the paper plate. The beaded rim of my invention uses a relatively narrow strip of metal, about one-half the width of that used in the prior art, and after being curled in generally circular cross-section is especially effective to resist bending stresses at the plate rim.

The plate may be formed of paper, paper board or any similar fibrous material and may comprise laminated material made up of sheets of paper and metal foil adhesively secured in full surface engagement. The reenforcing rim strip is preferably of metal but may be made of any bendable material capable of maintaining a given shape.

Furthermore, no special clamping means or operations are necessary in my invention wherein the plate material is penetrated by opposite lateral edges of the curled strip to provide a secure fastening and locking relation between the strip and plate which is firm in operation and presents an attractive and neat appearance to the eye.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for applying a stiffening rim to the periphery of a generally circular article formed mainly of fibrous material, comprising means supporting said article for free rotation with a peripheral edge thereof adjacent a rim securing station, means for advancing a substantially straight preformed metal strip into said station, said strip travelling substantially tangentially to said article edge when it reaches said station, means at said station for bending said strip about said article edge in such a manner that opposite lateral edges of said strip are pressed into intimate locking relation with the material of the article wall at opposite sides thereof at said edge and said strip is caused to assume the same curvature as the periphery of said article, said last-named means also being operable to synchronously rotate said article and advance said strip through said station, whereby said strip is progressively fastened along the peripheral edge of said article.

2. Apparatus for applying a stiffening rim upon a generally circular member, comprising means supporting said member for free rotation with its peripheral edge adjacent a rim securing station, means for laterally prebending a strip of metal and advancing it longitudinally toward said station in substantially straight condition substantially tangentially of the peripheral edge of said member, means at said station for further bending said strip transversely of its length around the peripheral edge of said member with the opposite lateral sides of said bent strip disposed angularly with respect to the opposite sides of said member at said edge, whereby the opposite lateral edges of said strip are forced into intimate locking engagement with said member, and simultaneously bending said strip longitudinally of its length so as to conform substantially to the periphery of said member, said means also being operable to rotate said member and advance said strip through said station so that said strip is progressively fastened along the peripheral edge of said member.

3. In an apparatus for applying a stiffening rim to the peripheral edge of a member, a pair of rolls mounted for rotation in closely adjacent cooperating relationship with each other to define a strip-bending pass; means mounting said member for rotation adjacent said rolls so that upon rotation thereof its peripheral edge will be constantly maintained in said strip-bending pass; means for feeding a narrow strip of metal endwise into said bending rolls substantially tangentially with respect to the peripheral edge of said member; means for rotating said bending rolls for causing said strip to be simultaneously curved longitudinally around the peripheral edge of said member and bent transversely of its length into biting engagement with opposite sides of the latter; and a stationary curling shoe located beyond said bending rolls and conforming to the curvature of the periphery of said member and frictionally cooperating with said strip for insuring that the latter will accurately conform to the shape of the peripheral edge of said member.

4. In an apparatus for applying a stiffening rim to the peripheral edge of a member, a pair of rolls mounted for rotation in closely adjacent cooperating relationship with each other to define a strip-bending pass; means mounting said member for rotation adjacent said rolls so that upon rotation thereof its peripheral edge will be constantly maintained in said strip-bending pass; means for feeding a narrow strip of metal endwise into said bending rolls substantially tangentially with respect to the peripheral edge of said member; means for rotating said bending rolls for causing said strip to be simultaneously curved longitudinally around the peripheral edge of said member and bent transversely of its length into biting engagement with opposite sides of the latter; and a stationary secondary bending shoe supported adjacent said rolls and having a groove therein located in the plane of the peripheral edge of said member, said groove being of a size to exert a final crimping action upon said strip as the latter is propelled therethrough by said bending rolls and subsequent to bending of said strip in said pass.

5. In an apparatus for applying a stiffening rim to the peripheral edge of a member, a pair of bending rolls mounted for rotation about spaced substantially parallel axes and adapted to be moved relatively toward and away from each other; a mandrel mounted for rotation adjacent said rolls and adapted to support said member with its peripheral edge adjacent said rolls; a rotatable clamping element adapted to frictionally grip said member between it and said mandrel; and means for moving said rolls toward each other and also substantially simultaneously moving said clamping element toward said mandrel.

6. In an apparatus for applying a stiffening rim to the peripheral edge of a member, a pair of bending rolls mounted for rotation about spaced substantially parallel axes and adapted to be moved relatively toward and away from each other; a mandrel mounted for rotation adjacent said rolls and adapted to support said member with its peripheral edge adjacent said rolls; a rotatable clamping element adapted to frictionally grip said member between it and said mandrel; means for holding a piece of partially formed run material in position adjacent said bending rolls; and means for moving said rolls toward each other and also moving said clamping element toward said mandrel, said last-named means also being operable to substantially simultaneously feed said material into said bending rolls.

7. In an apparatus for applying a stiffening rim to the peripheral edge of a member, a pair of bending rolls mounted for rotation about spaced substantially parallel axes and adapted to be moved relatively toward and away from each other; a mandrel mounted for rotation adjacent said rolls and adapted to support said member with its peripheral edge adjacent said rolls; a rotatable clamping element adapted to frictionally grip said member between it and said mandrel; a rotatable shaft; power means for rotating said shaft and said bending rolls; a clutch mechanism driven by said shaft and having operative connection with said rolls for bringing them together when said clutch mechanism is actuated; and common means for substantially simultaneously actuating said clutch mechanism and moving said clamping element toward said mandrel.

8. In combination, a pair of rolls mounted for rotation about generally parallel axes and adapted to cooperate with opposite sides of the edge of a member for securing a reenforcing strip thereto, said rolls each having a circumferential groove of substantially semi-circular shape in cross-section and cooperating with each other to define a bending pass of substantially circular shape; means mounting said member with its edge for travelling movement through said pass; means for feeding a substantially straight strip of metal endwise into said pass adjacent said member, said strip of metal being of such width that when it is transversely bent into substantially circular shape in cross-section it will substantially fill and conform to said circular pass, and the lateral edges of said strip will be brought into tight engagement with surfaces of said article adjacent its edge, and means for rotating said rolls to bend said strip and force its side edges into engagement with the edge of said member, said rolls being operable to confine said strip against movement in any direction other than in the direction of its length.

9. In an apparatus for applying a stiffening rim to the peripheral edge of an article of generally circular shape, a rotatable support for said article; means for releasably maintaining said article in place on said support; means for feeding a relatively narrow strip of metal endwise to a rim securing station located adjacent said support, a portion of the peripheral edge of the article on said support extending within said station adjacent said strip; means at said station for simultaneously rotating said article and support and maintaining said strip in predetermined relationship to the edge of said article and progressively bending said strip laterally and fastening it along the edge of said rotating article, said last-named means also cooperating with said support for causing said strip to be bent circumferentially around said article, and comprising a pair of strip curling rolls at said station for engaging and bending said strip about said article edge; means for urging one of said rolls towards the other while said rim is being applied; and means for automatically effecting separation of said rolls after the rim has been applied.

10. In an apparatus for applying a stiffening rim to the peripheral edge of an article having a substantially circular edge, a pair of strip curling rolls each having a circumferential groove of semi-circular shape in cross-section; means mounting said rolls for rotation about substantially parallel axes with their grooves disposed in closely adjacent cooperating relationship with each other to define a substantially circular strip-bending pass; a support for said article located adjacent said rolls; means mounting said support for rotation about a fixed axis so located that upon rotation thereof, with an article in place thereon, the peripheral edge of said article will be constantly maintained in bisecting relationship to said circular strip-bending pass between said rolls; means for feeding a substantially straight, narrow strip of metal of predetermined length into said bending rolls substantially tangentially with respect to the circular edge of said article; and means for rotating said bending rolls for causing said strip to be transversely bent into tight engagement with the opposite sides of the edge of said article, said support being restrained against radial movement with respect to said fixed axis, so as to overcome the inherent tendency of said strip to maintain its straight form as it is curved circumferentially around said article, and said circular pass restraining said strip against displacement in any direction other than in the direction of its length, whereby rotation of said rolls will simultaneously cause said strip to be progressively brought into conformity with the circular edge of said article, and said strip being longer than the circumference of said article, whereby upon completion of a substantially full revolution of said support the ends of said strip will be overlapped and frictionally interlocked.

ALLEN B. WILSON.
EDWIN V. SWANGREN.